United States Patent
Godet et al.

(10) Patent No.: US 12,216,243 B2
(45) Date of Patent: Feb. 4, 2025

(54) AIR-SPACED ENCAPSULATED DIELECTRIC NANOPILLARS FOR FLAT OPTICAL DEVICES

(71) Applicant: Applied Materials, Inc., Santa Clara, CA (US)

(72) Inventors: Ludovic Godet, Sunnyvale, CA (US); Tapashree Roy, Bangalore (IN); Prerna Sonthalia Goradia, Mumbai (IN); Srobona Sen, Mumbai (IN); Robert Jan Visser, Menlo Park, CA (US); Nitin Deepak, Mumbai (IN); Tapash Chakraborty, Maharashtra (IN)

(73) Assignee: Applied Materials, Inc., Santa Clara, CA (US)

( * ) Notice: Subject to any disclaimer, the term of this patent is extended or adjusted under 35 U.S.C. 154(b) by 1101 days.

(21) Appl. No.: 16/905,703

(22) Filed: Jun. 18, 2020

(65) Prior Publication Data

US 2020/0400990 A1    Dec. 24, 2020

(30) Foreign Application Priority Data

Jun. 18, 2019  (IN) .............................. 201941024110

(51) Int. Cl.
  *G02F 1/1339*  (2006.01)
  *B32B 3/20*  (2006.01)
  *G02B 1/06*  (2006.01)

(52) U.S. Cl.
  CPC .................. G02B 1/06 (2013.01); B32B 3/20 (2013.01); *G02B 2207/101* (2013.01); *G02B 2207/109* (2013.01); *G02F 1/13398* (2021.01)

(58) Field of Classification Search
  CPC .............................. B32B 3/20; G02F 1/13398
  See application file for complete search history.

(56) References Cited

U.S. PATENT DOCUMENTS

| 5,736,425 A | 4/1998 | Smith et al. |
| 9,449,871 B1 | 9/2016 | Bergendahl et al. |
| (Continued) | | |

FOREIGN PATENT DOCUMENTS

| EP | 1416303 A2 | 5/2004 |
| EP | 1416303 B1 | 11/2010 |
| (Continued) | | |

OTHER PUBLICATIONS

Translation of Shibuya, JP2005266343 (Year: 2005).*

(Continued)

*Primary Examiner* — Ian A Rummel
(74) *Attorney, Agent, or Firm* — Patterson + Sheridan, LLP

(57) ABSTRACT

Embodiments described herein relate to flat optical devices and methods of forming flat optical devices. One embodiment includes a substrate having a first arrangement of a first plurality of pillars formed thereon. The first arrangement of the first plurality of pillars includes pillars having a height h and a lateral distance d, and a gap g corresponding to a distance between adjacent pillars of the first plurality of pillars. An aspect ratio of the gap g to the height h is between about 1:1 and about 1:20. A first encapsulation layer is disposed over the first arrangement of the first plurality of pillars. The first encapsulation layer has a refractive index of about 1.0 to about 1.5. The first encapsulation layer, the substrate, and each of the pillars of the first arrangement define a first space therebetween. The first space has a refractive index of about 1.0 to about 1.5.

15 Claims, 10 Drawing Sheets

(56) References Cited

U.S. PATENT DOCUMENTS

| | | |
|---|---|---|
| 2004/0109483 A1 | 6/2004 | Simpson et al. |
| 2004/0125266 A1 | 7/2004 | Miyauchi et al. |
| 2007/0267057 A1 | 11/2007 | Haluzak et al. |
| 2014/0071541 A1 | 3/2014 | Rousseau et al. |
| 2014/0272295 A1* | 9/2014 | Deshpande ........ G02B 27/0006 428/141 |
| 2016/0054476 A1 | 2/2016 | Choi et al. |
| 2016/0131808 A1 | 5/2016 | Kristensen et al. |
| 2016/0225716 A1 | 8/2016 | Lu et al. |
| 2018/0224574 A1 | 8/2018 | Lee et al. |
| 2018/0292644 A1* | 10/2018 | Kamali ................... G02B 3/00 |

FOREIGN PATENT DOCUMENTS

| | | | |
|---|---|---|---|
| JP | 2005266343 A | 9/2005 | |
| JP | 2006520697 A | 9/2006 | |
| JP | 2007125665 A | 5/2007 | |
| JP | 2008165207 A | 7/2008 | |
| JP | 2009187025 A | 8/2009 | |
| JP | 2011191474 A | 9/2011 | |
| JP | 2017536824 A | 12/2017 | |
| TW | 201303401 A | 1/2013 | |
| TW | 201610611 A | 3/2016 | |
| TW | 201906719 A | 2/2019 | |
| TW | 201908232 A | 3/2019 | |
| WO | 2007137044 A2 | 11/2007 | |

OTHER PUBLICATIONS

Taiwan Office Action issued to Application No. 109120552 on Dec. 7, 2021.
Korean Office Action issued to Patent Application No. 10-2022-7001518 on Mar. 21, 2023.
Japanese Office Action issued to Patent Application No. 2021-575343 on Jan. 17, 2023.
International Search Report/Written Opinion issued to PCT/US2020/037961 on Sep. 23, 2020.
European Search Report issued to Patent Application No. 20827300.3 on Jun. 26, 2023.
India Office Action issued to Patent Application No. 202247001457 on Mar. 8, 2022.
Taiwan Office Action issued to Application No. 109120552 on Apr. 28, 2021.
Korean Office Action issued to Patent Application No. 10-2022-7001518 on Oct. 31, 2023.
Japanese Office Action issued to Patent Application No. 2021-575343 on Oct. 3, 2023.
Japanese Office Action issued to patent application No. 2021-575343 on Sep. 17, 2024.
Chinese Office Action issued to patent application No. 202080048619.3 on Jun. 17, 2024.

* cited by examiner

AIR-SPACED ENCAPSULATED DIELECTRIC NANOPILLARS FOR FLAT OPTICAL DEVICES

CROSS-REFERENCE TO RELATED APPLICATIONS

This application claims priority to India Provisional Patent Application Serial No. 201941024110, filed on Jun. 18, 2019, which herein is incorporated by reference.

BACKGROUND

Field

Embodiments of the present disclosure generally relate to optical devices. More specifically, embodiments described herein relate to flat optical devices and methods of forming flat optical devices.

Description of the Related Art

Flat optical devices include arrangements of pillars with in-plane dimensions smaller than half a design wavelength of light, and an out-of-plane dimension of the order of or larger than the design wavelength. A flat optical device may consist of a single, or multiple layers of nanostructured pillars. The pillars of a flat optical device need encapsulation to serve as a protective layer as well as to function as a spacer layer between successive layers of a multilayer arrangement. However, for nanostructured flat optical devices, filling in high aspect ratio openings is often challenging and results in non-uniform gap-fill. Furthermore, the encapsulation of the pillars increases the height of the pillars, and thus increases the total thickness of the flat optical device. The increase in the total thickness of the flat optical device lowers transmission efficiency and increases manufacturing complexity and cost. Therefore, what is needed in the art are improved flat optical devices and methods of forming flat optical devices.

SUMMARY

In one embodiment, a device is provided. The device includes a substrate. The substrate has a first arrangement of a first plurality of pillars formed thereon. The first arrangement of the first plurality of pillars includes pillars having a height h and a lateral distance d, and a gap g corresponding to a distance between adjacent pillars of the first plurality of pillars. An aspect ratio of the gap g to the height h is between about 1:1 and about 1:20. A first encapsulation layer is disposed over the first arrangement of the first plurality of pillars. The first encapsulation layer has a refractive index of about 1.0 to about 1.5. The first encapsulation layer, the substrate, and each of the pillars of the first arrangement define a first space therebetween. The first space has a refractive index of about 1.0 to about 1.5.

In one embodiment, a device is provided. The device includes a substrate. The substrate has a first arrangement of a first plurality of pillars formed thereon. The first arrangement of the first plurality of pillars includes pillars having a height h and a lateral distance d, and a gap g corresponding to a distance between adjacent pillars of the first plurality of pillars. An aspect ratio of the gap g to the height h is between about 1:1 and about 1:20, wherein the gap g is composed of a silica-containing aerogel material with nanoscale porosities within the silica-containing material, the silica-containing aerogel material having a gap-fill portion disposed in the gap g having the aspect ratio. A first encapsulation layer is disposed over the first arrangement of the first plurality of pillars. The first encapsulation layer has a refractive index of about 1.0 to about 1.5. The first encapsulation layer, the substrate, and each of the pillars of the first arrangement define a first space therebetween. The first space has a refractive index of about 1.0 to about 1.5.

In yet another embodiment, a method is provided. The first arrangement of the first plurality of pillars includes pillars having a height h and a lateral distance d, and a gap g corresponding to a distance between adjacent pillars of the first plurality of pillars. An aspect ratio of the gap g to the height h is between about 1:1 and about 1:20. A silica-containing aerogel material is deposited. The depositing the silica-containing aerogel material includes a silica-containing aerogel material formation process to form nanoscale porosities in the silica-containing aerogel material. The silica-containing aerogel material has a gap-fill portion disposed in the gap g having the aspect ratio, and an encapsulate portion disposed over the gap-fill portion and the first arrangement of the first plurality of pillars.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to flat optical devices and methods of forming flat optical devices. One embodiment includes a substrate having a first arrangement of a first plurality of pillars formed thereon. The first arrangement of the first plurality of pillars includes pillars having a height h and a lateral distance d, and a gap g corresponding to a distance between adjacent pillars of the first plurality of pillars. An aspect ratio of the gap g to the height h is between about 1:1 and about 1:20. A first encapsulation layer is disposed over the first arrangement of the first plurality of pillars. The first encapsulation layer has a refractive index of about 1.0 to about 1.5. The first encapsulation layer, the substrate, and each of the pillars of the first arrangement define a first space therebetween. The first space has a refractive index of about 1.0 to about 1.5.

Figure 1A:
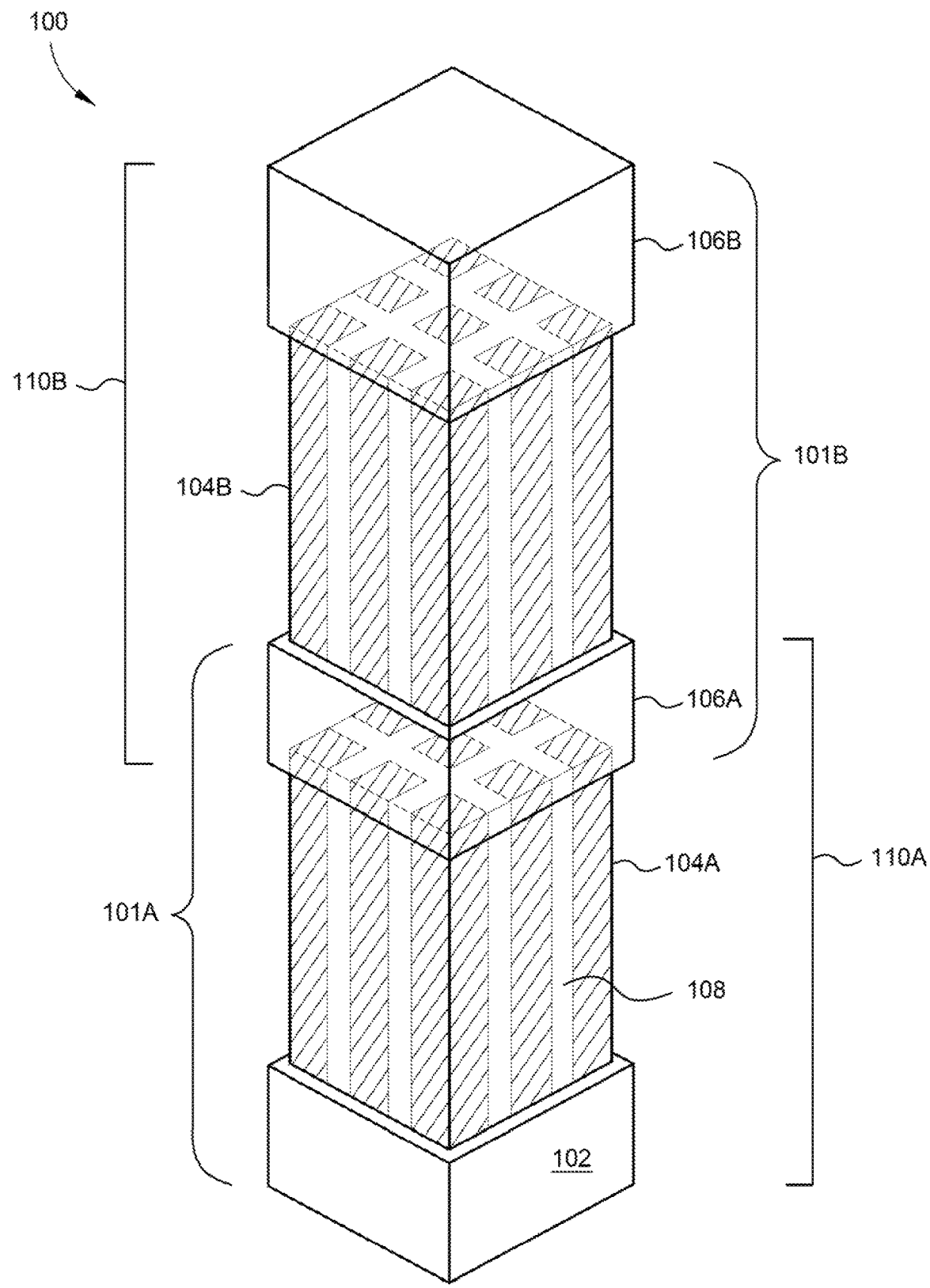
FIG. 1A is a schematic, perspective view of a flat optical device according to an embodiment described herein.
Figure 1C:
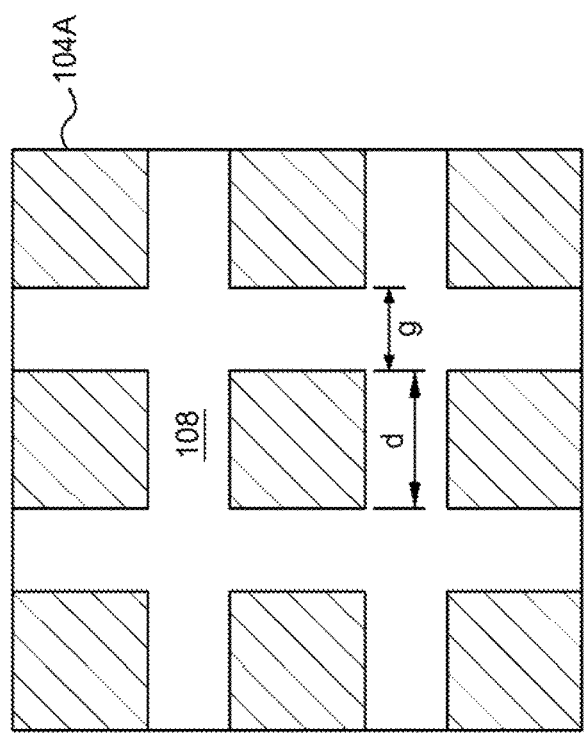
FIG. 1C is a schematic, top view of an arrangement of pillars of a layer stack according to an embodiment described herein.
Figure 1B:
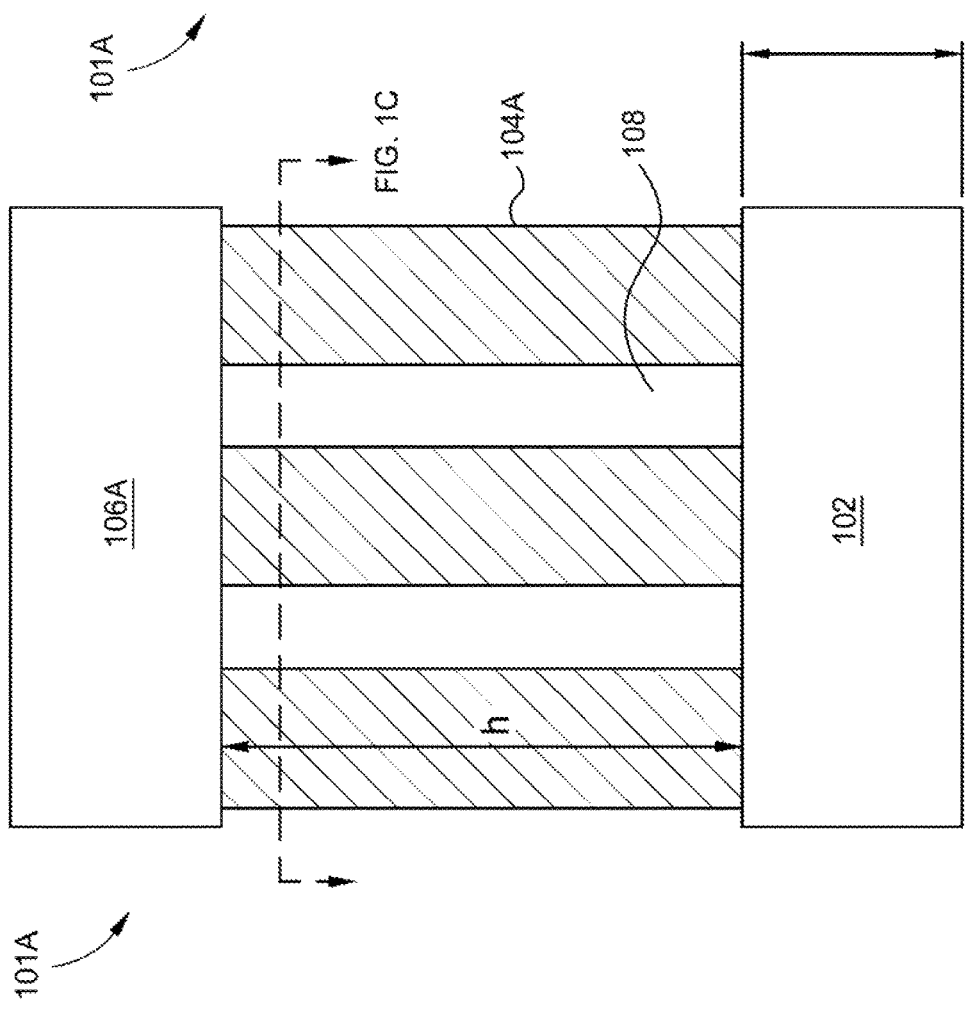
FIG. 1B is a schematic, cross-sectional view of a layer stack according to an embodiment described herein.

FIG. 1A is a schematic, perspective view of a flat optical device 100 having at least one layer stack 101A, 101B. FIG. 1B is a schematic, cross-sectional view of the layer stack 101A. FIG. 1C is a schematic, top view of an arrangement of pillars 104 of the layer stack 101A. The flat optical device 100 includes at least one layer stack 101A, 101B. While aspects of the devices and methods described herein may be discussed in reference to the layer stack 101A, it is to be understood that aspects of the devices and methods described herein are similarly applicable to the layer stack 101B. Reference numerals may be omitted for the arrangement of the layer stack 101B for clarity in the Figures provided herein.

In one embodiment, which can be combined with other embodiments described herein, the flat optical device 100 is a single layer stack flat optical device that includes the layer stack 101A. In another embodiment, which can be combined with other embodiments described herein, the flat optical device 100 is a multi-layer stack optical device that includes the layer stack 101A and one or more layer stacks 101B. The layer stack 101A includes an arrangement of a plurality of pillars 104A disposed on a surface of the substrate 102 and an encapsulation layer 106A. In the embodiment of the multi-layer stack optical device, the first layer stack of the one or more layer stacks 101B is disposed over the layer stack 101A. In one embodiment, which can be combined with other embodiments described herein, the first layer stack of the layer stacks 101B includes an arrangement of a plurality of pillars 104B disposed on the encapsulation layer 106A. In another embodiment, which can be combined with other embodiments described herein, the arrangement of a plurality of pillars 104B of the first layer stack of the layer stacks 101B is disposed on a spacer layer (not shown) disposed on the encapsulation layer 106A. In embodiments including the spacer layer, the spacer layer is operable to provide support for the arrangement of the plurality of pillars 104B, and is of a specified thickness according to the optical functionality of the flat optical device 100.

The arrangement of the plurality of pillars 104A, 104B includes pillars 104A, 104B having a height h and a lateral distance d. The height h of the pillars 104A is defined as the distance from the surface of the substrate 102 to the encapsulation layer 106A. The height h of the pillars 104B is defined as the distance from the encapsulation layer 106A and a spacer layer (not shown) disposed on the encapsulation layer 106A to the encapsulation layer 106B. In another embodiment, which can be combined with other embodiments described herein, the cross-section of the pillars 104A, 104B is square and/or rectangular and the lateral distance d of the pillars 104A, 104B corresponds to a width of the pillars 104A, 104B. In another embodiment, which can be combined with other embodiments described herein, the cross-section of the pillars 104A, 104B is circular and the lateral distance d of the pillars 104A, 104B corresponds to a diameter of the pillars 104A, 104B. The gap g is a distance between adjacent pillars of the pillars 104A, 104B. In one embodiment, each of the arrangement of the plurality of pillars 104A, 104B has an aspect ratio (g:h) between about 1:1.5 and about 1:10. In another embodiment, each of the arrangement of the plurality of pillars 104A, 104B has an aspect ratio (g:h) between about 1:1.5 and about 1:2.5. In yet another embodiment, each of the arrangement of the plurality of pillars 104A, 104B has an aspect ratio (g:h) between about 1:1 and about 1:20.

The lateral distance d and the gap g are less than half of a wavelength of operation. The wavelength of operation corresponds to a wavelength or wavelength range. In one example, the wavelength or wavelength range includes one or more wavelengths in the UV region to near-infrared region (i.e., from about 300 nm to about 1500 nm). Therefore, for example, at a wavelength of 700 nm the distance d and the gap g are less than 350 nm. In one embodiment, which can be combined with other embodiments described herein, the lateral distance d of each pillar of the plurality of pillars 104A is substantially the same. In another embodiment, which can be combined with other embodiments described herein, the lateral distance d of at least one pillar is different than the lateral distance d of additional pillars of the plurality of pillars 104A. In one embodiment, which can be combined with other embodiments described herein, the gap g of each of the adjacent pillars of the plurality of pillars 104A is substantially the same. In another embodiment, which can be combined with other embodiments described herein, the gap g of at least one set of adjacent pillars is different that the gap g of additional sets of adjacent pillars of the plurality of pillars 104A. In some embodiments, which can be combined with other embodiments described herein, the arrangement of the plurality of pillars 104B corresponds to (i.e., matches) the arrangement of the plurality of pillars 104A. In other embodiments, which can be combined with other embodiments described herein, the arrangement of the plurality of pillars 104B does not correspond to the arrangement of the plurality of pillars 104A.

The substrate 102 may be selected to transmit light at the wavelength of operation. Without limitation, in some embodiments, the substrate 102 is configured such that the substrate 102 transmits greater than or equal to about 50%, 60%, 70%, 80%, 90%, 95%, 99% of the UV region of the light spectrum. The substrate 102 may be formed from any suitable material, provided that the substrate 102 can adequately transmit light of the wavelength of operation and can serve as an adequate support for at least the arrangement of the plurality of pillars 104A and the encapsulation layer 106A. In some embodiments, which can be combined with other embodiments described herein, the material of substrate 102 has a refractive index that is relatively low, as compared to the refractive index of materials used in each of the pillars 104A, 104B. Substrate selection may include substrates of any suitable material, including, but not limited to, semiconductor, doped semiconductor, amorphous dielectrics, non-amorphous dielectrics, crystalline dielectrics, silicon oxide, polymers, and combinations thereof. In some embodiments, which can be combined with other embodiments described herein, the substrate 102 includes a transparent material. The substrate 102 is transparent with an absorption coefficient less than 0.001. Examples may include, but are not limited to, an oxide, sulfide, phosphide, telluride, and combinations thereof. In one example, the substrate 102 includes silica ($SiO_2$) containing materials.

The pillars 104A, 104B include materials, not limited to, titanium dioxide ($TiO_2$), zinc oxide (ZnO), tin dioxide ($SnO_2$), aluminum-doped zinc oxide (AZO), fluorine-doped tin oxide (FTO), cadmium stannate (tin oxide) (CTO), zinc stannate (tin oxide) ($SnZnO_3$), and silicon containing materials. The silicon containing materials may include at least one of silicon nitride ($Si_3N_4$) or amorphous silicon (a-Si) containing materials. The pillars 104A, 104b may have a refractive of about 1.8 or greater, and absorption coefficient less than 0.001. In one embodiment, which can be combined with other embodiments described herein, the refractive index of the encapsulation layer 106A, 106B is about 1.0 to about 1.5. The encapsulation layer 106A, 106B has an absorption coefficient less than 0.001. In some embodiments, which can be combined with other embodiments described herein, the encapsulation layer 106A, 106B and the substrate 102 include substantially the same materials. In one embodiment, the conformal encapsulation layer 306A has a thickness of about 2 nm to about 100 nm. In another embodiment, the encapsulation layer 106A has a thickness less than 50 μm. In another embodiment, the encapsulation layer 306A has a thickness of about 1 μm to about 2 μm.

The materials and dimensions of the encapsulation layer 106A, 106B are further described in the methods provided herein. Utilization of the materials, dimensions, and processes described herein of the encapsulation layer 106A, 106B, and the composition of a space 108 corresponding to the gap g provides for a height h of the pillars 104A, 104B of about 1500 nm or less. In some embodiments, which can be combined with other embodiments described herein, the height h of the pillars 104A, 104B is about 500 nm or less. The height h of the pillars 104A, 104B reduces the thickness 110A, 110B of the layer stack 101A, 101B and total thickness of the flat optical device 100. The reduced total thickness of the flat optical device 100 provides for higher transmission efficiency due to impedance matching and device symmetry, as compared to bare optical devices, and reduced manufacturing complexity and cost.

The composition of the space 108 corresponding to the gap g includes at least one of air, having a refractive index of 1.0 and an absorption coefficient of 0, or a transparent material 107 (shown in FIGS. 1D-1F), having an absorption coefficient less than 0.001. In one embodiment, which can be combined with other embodiments described herein, the refractive index of the transparent material 107 of the composition of the space 108 has a refractive index of about 1.0 to about 1.5. In some embodiments, which can be combined with other embodiments described herein, the transparent material 107 includes one of silica containing materials or non-silica containing materials, such as polymer containing materials, for example, fluoropolymer material. In some embodiments, which can be combined with other embodiments described herein, the transparent material 107 includes fluorine containing materials, such as aluminum fluoride ($AlF_3$) and magnesium fluoride ($MgF_2$).

Figure 1D:
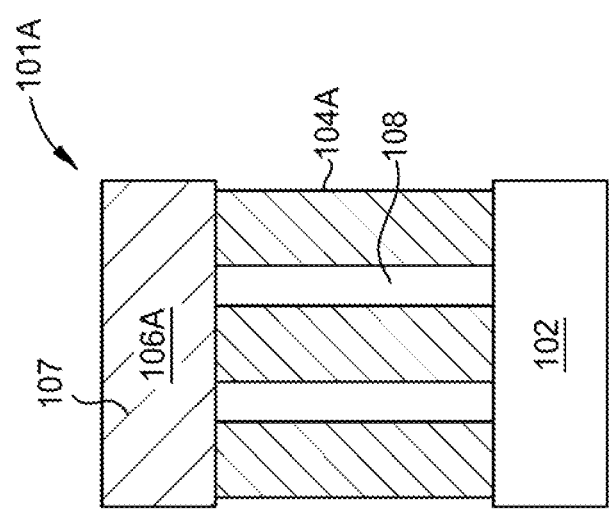
FIGS. 1D-1F are schematic, cross-sectional views of a layer stack according to embodiments described herein.
Figure 3A:
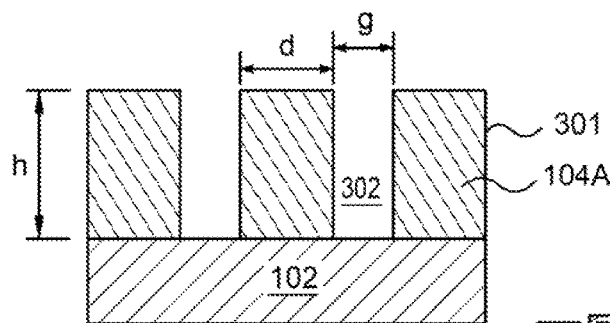
FIGS. 3A-3D are schematic, cross-sectional views of a substrate during a method of forming a flat optical device according to an embodiment described herein.
Figure 3B:
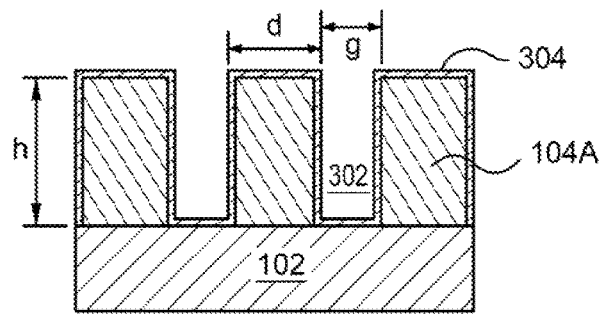
Figure 3C:
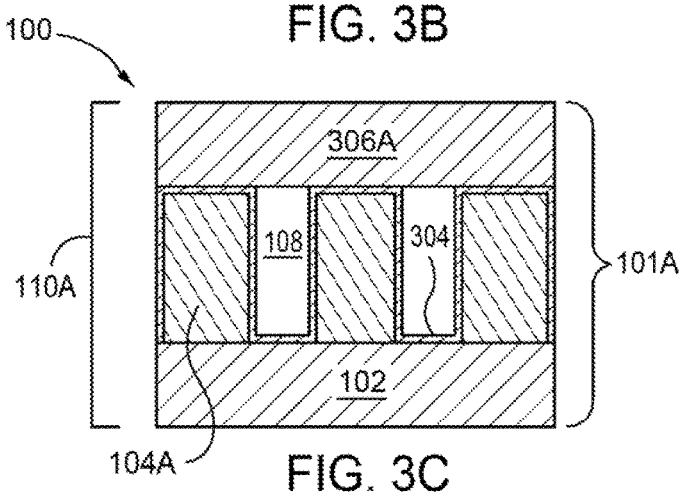
Figure 3D:
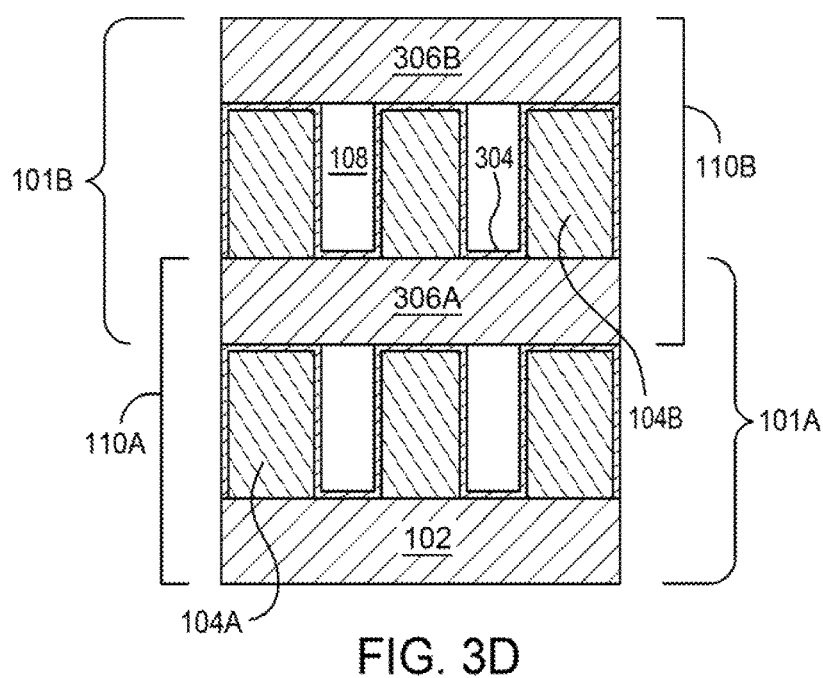
Figure 5A:
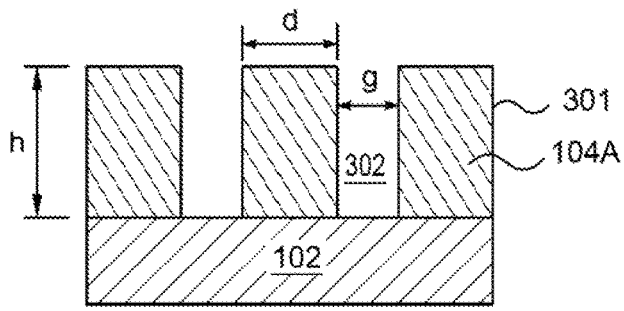
FIGS. 5A-5G are schematic, cross-sectional views of a substrate during a method of forming a flat optical device according to embodiments described herein.
Figure 5B:
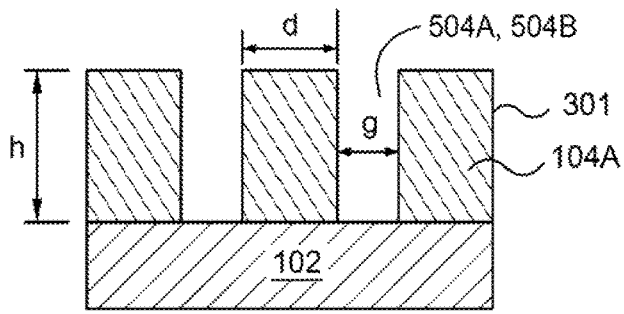
Figure 5C:
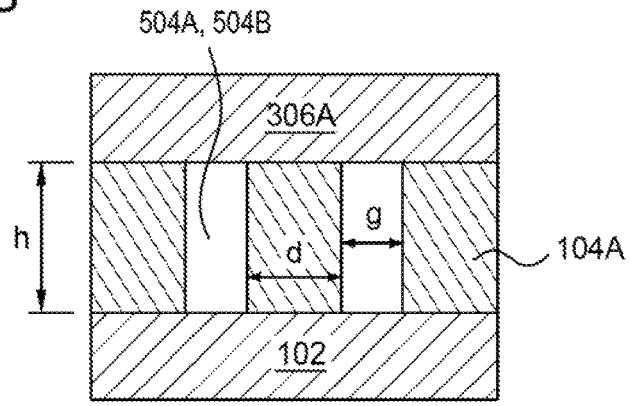
Figure 5D:
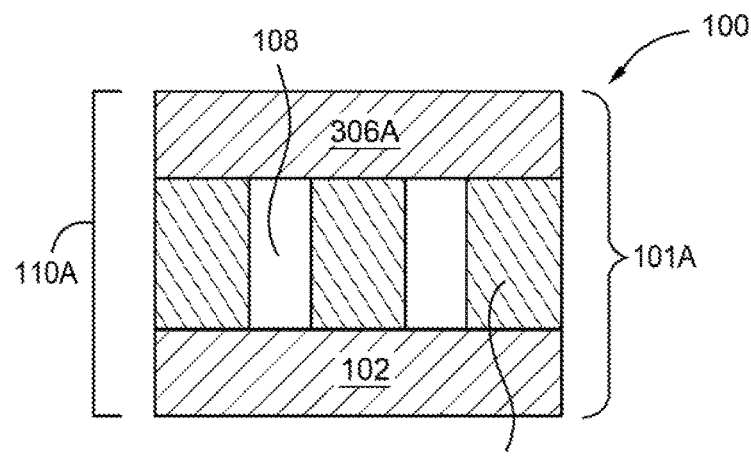
Figure 5E:
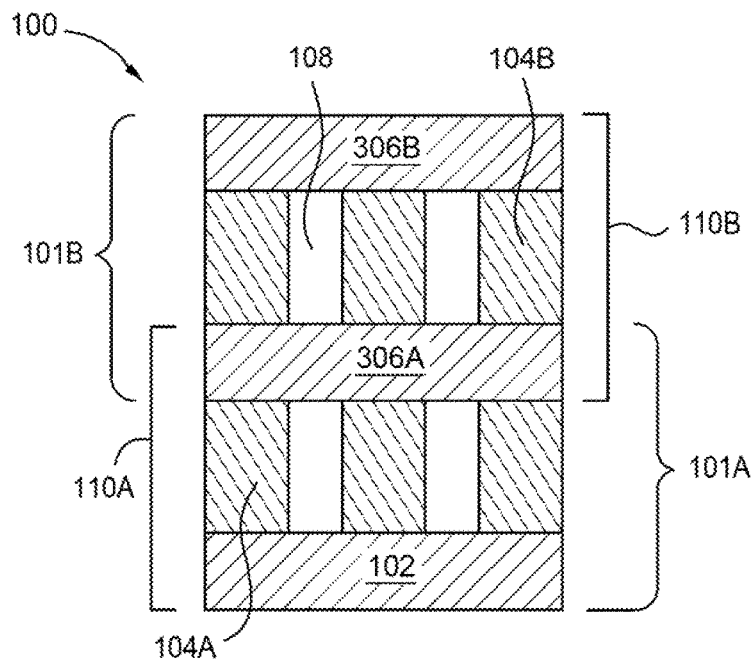
Figure 5F:
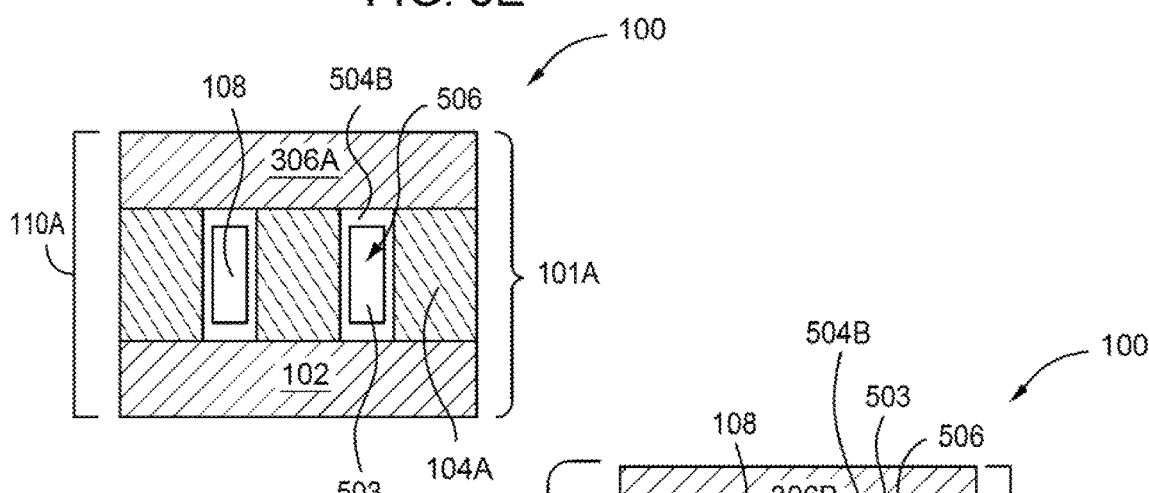
Figure 5G:
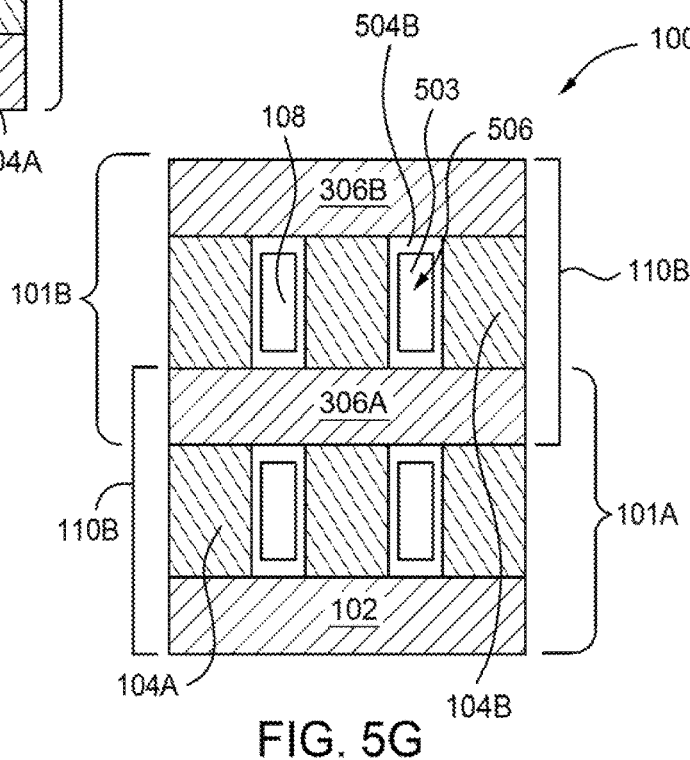

As shown in FIG. 1D, in one embodiment, which can be combined with other embodiments described herein, the encapsulation layer 106A of the layer stack 101A includes the transparent material 107 and the composition of the space 108 includes air (refractive index of 1.0). In some embodiments of the embodiment of FIG. 1D, the transparent material 107 has the refractive index of about 1.0 to about 1.5. The height h of the pillars 104A decreases as the refractive index of the transparent material 107 is reduced. One example of the embodiment of FIG. 1D includes the layer stack 101A of FIGS. 3C, 5D, and 5F.

Figure 1E:
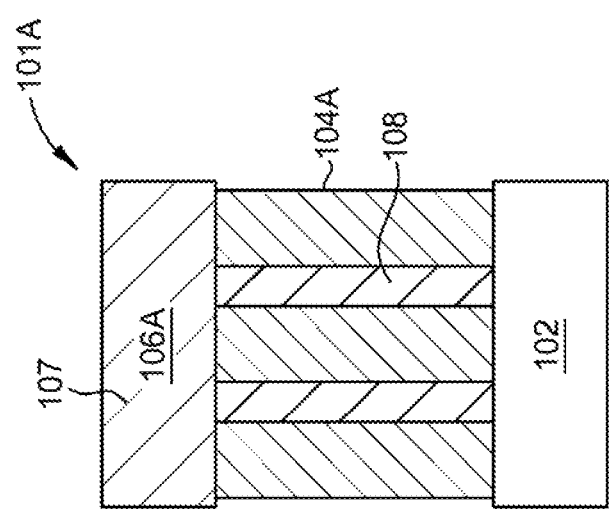

As shown in FIG. 1E, in another embodiment, which can be combined with other embodiments described herein, the encapsulation layer 106A of the layer stack 101A includes the transparent material 107 and the composition of the space 108 includes the transparent material 107. In some embodiments of the embodiment of FIG. 1E, the transparent material 107 has the refractive index of about 1.0 to about 1.5. The height h of the pillars 104A decreases as the refractive index of the transparent material 107 is reduced. For example, in some embodiments, the embodiment of FIG. 1D, with the composition of the space 108 including air, results in a lower height h. One example of the embodiment of FIG. 1E includes the layer stack 101A of FIG. 7B.

Figure 1F:
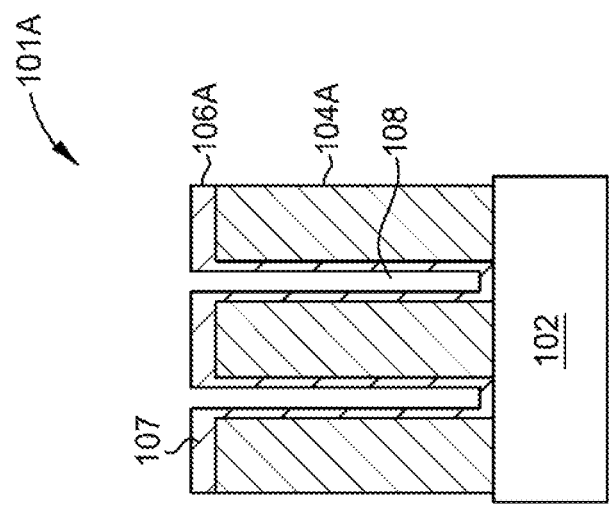

As shown in FIG. 1F, in another embodiment, which can be combined with other embodiments described herein, a conformal encapsulation layer 106A is disposed over the plurality of pillars 104A. In some embodiments, the conformal encapsulation layer 106A fills the space 108. In other embodiments, the conformal encapsulation layer 106A does not fill the space 108 such that the composition of the space 108 includes the transparent material 107 and air. In addition to the height h of the pillars 104A decreasing as the refractive index of the transparent material 107 is reduced, the composition of the space 108 including the transparent material 107 and air may reduce the height h of the pillars 104A. In some embodiments of the embodiment of FIG. 1D, the transparent material 107 has the refractive index of about 1.0 to about 1.5. The height h of the pillars 104A decreases as the refractive index of the transparent material 107 is reduced. One example of the embodiment of FIG. 1D includes the layer stack 101A of FIG. 9B.

In one embodiment, which can be combined with other embodiments described herein, the transparent material 107 of the embodiments of FIGS. 1D-1E includes one of silica containing materials or non-silica containing materials, such as polymer containing materials, for example, fluoropolymer materials. In another embodiment, which can be combined with other embodiments described herein, the transparent material 107 of the embodiments of FIGS. 1D-1E includes a silica-containing aerogel material. The silica-containing aerogel material includes nanoscale porosities to provide air gaps in the space 108. In one embodiment, which can be combined with other embodiments described herein, the silica-containing aerogel material has a porosity, corresponding to the nanoscale air gaps, of about 95% or greater. The nanoscale porosity of the silica-containing aerogel material reduces the refractive index of silica. The reduced refracted index decreases the height h. The silica-containing aerogel material is hydrophobic to protect the pillars 104A from external factors.

Figure 2:
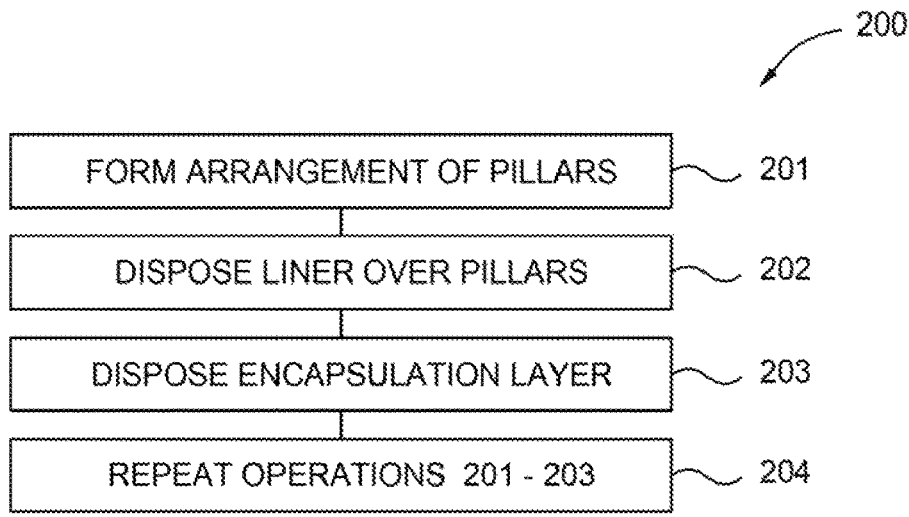
FIG. 2 is a flow diagram of a method of forming a flat optical device according to an embodiment described herein.

FIG. 2 is a flow diagram of a method 200 of forming a flat optical device 100, as shown in FIGS. 3A-3D. At operation 201, an arrangement of a plurality of pillars 104A is formed on the surface of the substrate 102. In one embodiment, which can be combined with other embodiments described herein, forming the arrangement of a plurality of pillars 104A includes disposing a pillar material 301 over the surface of the substrate 102 and removing portions of the pillar material 301 to form trenches 302. The trenches 302 correspond to the gap g of the pillars 104A (including the space 108 of the flat optical device 100), the remaining portions of the trenches correspond to the lateral distance d, and the thickness of the pillar material 301 corresponds to the height h.

In one embodiment, which can be combined with other embodiments described herein, the pillar material 301 includes oxides. At optional operation 202, a liner 304 is disposed over the oxide-free pillars 104A. The liner 304 protects the pillars 104A from oxidation from disposing an encapsulation layer 306A that includes an oxide containing material, such as silica. In one embodiment, which can be combined with other embodiments described herein, the liner 304 has a refractive index of about 1.0 to about 1.5. In one embodiment, which can be combined with other embodiments described herein, the liner 304 has a thickness of about 1 nm to about 100 nm. The liner 304 may be disposed by atomic layer deposition (ALD), such as rapid ALD. In one embodiment, which can be combined with other embodiments described herein, a silica containing liner 304 is conformably disposed over the pillars 104A by an ALD process that includes alternating flows of TMA ($AlMe_3$) and ($^tButO)_3SiOH$. Each TMA($AlMe_3$) and $(tButO)_3SiOH$ flow cycle forms a sublayer having a thickness of about 12 nm (greater than 32 monolayers).

At operation 203, an encapsulation layer 306A, corresponding to the encapsulation layer 106A, is disposed over the pillars 104A. Disposing the encapsulation layer 306A may include, but is not limited to, chemical vapor deposition (CVD), plasma enhanced CVD (PECVD), ALD, rapid ALD, spray coating, or spin coating. In one embodiment, which can be combined with other embodiments described herein, the encapsulation layer 306A has a thickness of about 1 μm to about 10 μm. In another embodiment, which can be combined with other embodiments described herein, the encapsulation layer 306A has a thickness of about 1 μm to about 2 μm. Operations 201-203 form a single layer stack flat optical device 100 that includes the layer stack 101A. At operation 204, at least operations 201-203 are repeated at least once to form a multi-layer stack optical device having the layer stack 101A and at least one layer stack 101B. The layer stack 101B includes at least the encapsulation layer 306A, the arrangement of a plurality of pillars 104B, and the encapsulation layer 306B. The arrangement of a plurality of pillars 104B formed via operation 201 is disposed on one of the encapsulation layer 306A and a spacer layer (not shown) disposed on the encapsulation layer 306A.

Figure 4A:
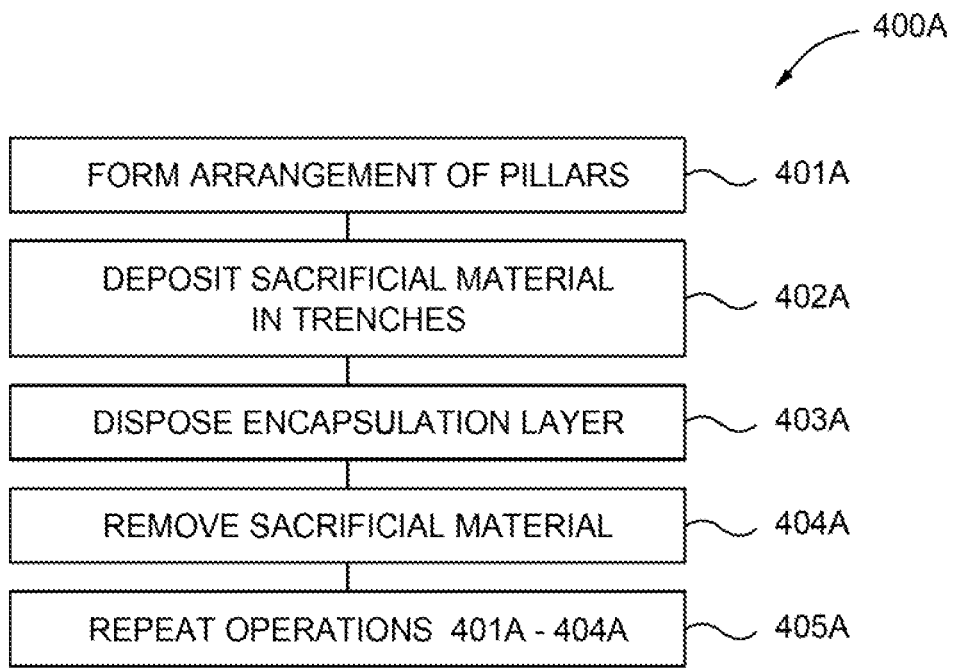
FIG. 4A and FIG. 4B are flow diagrams of methods of forming a flat optical device according to embodiments described herein.
Figure 4B:
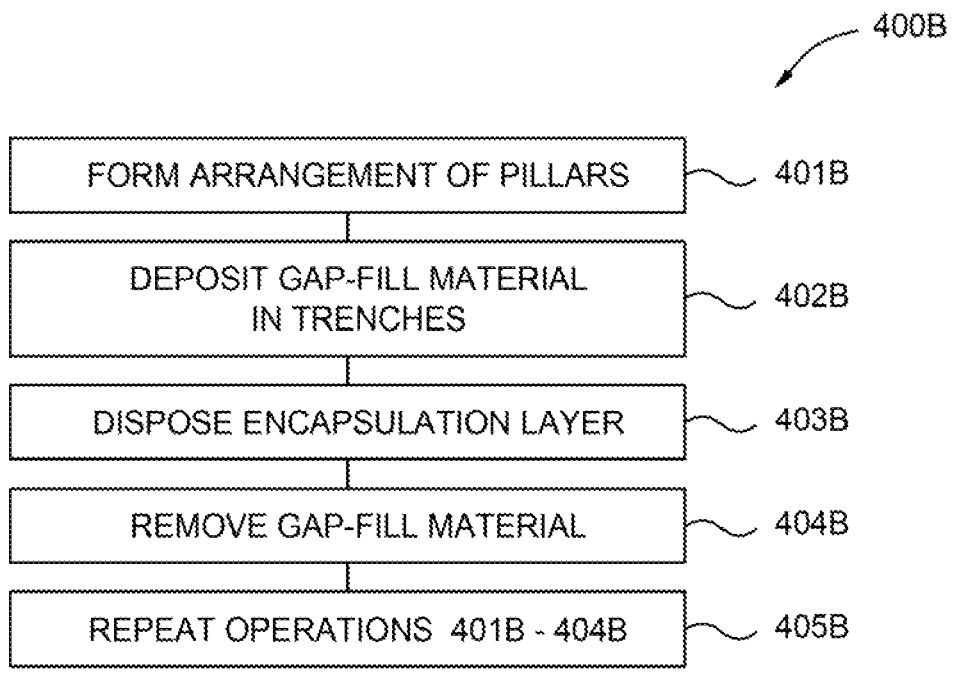

FIG. 4A is a flow diagram of a method 400A of forming a flat optical device 100, as shown in FIGS. 5A-5E. FIG. 4B is a flow diagram of a method 400B of forming a flat optical device 100, as shown in FIGS. 5A-5E. At operation 401A, 401B of the method 400A and the method 400B, as described in operation 201 of the method 200, an arrangement of a plurality of pillars 104A is formed on the surface of the substrate 102. At operation 402A, a sacrificial material 504A to be removed is deposited in the trenches 302. In one embodiment, which can be combined with other embodiments described herein, the sacrificial material 504A is deposited by hot-wire CVD (HWCVD), PECVD, or inductively coupled (ICPCVD). At operation 402B, a gap-fill material 504B to be reduced in area is deposited in the trenches 302.

At operation 403A, 403B, an encapsulation layer 306A, corresponding to the encapsulation layer 106A, is disposed over the pillars 104A and one of the sacrificial material 504A and gap-fill material 504B. Disposing the encapsulation layer 306A may include, but is not limited to, no-flow chemical vapor deposition (CVD), ALD, rapid ALD, PECVD, spray coating, or spin coating. At operation 404A, the sacrificial material 504A is removed. In one embodiment, which can be combined with other embodiments described herein, the sacrificial material is removed via thermal annealing. At operation 404B, the gap-fill material 504B is reduced by an area 506 in the space 108 such that the gap g includes the gap-fill material 504B with a center air gap 503 disposed in the area 506. In one embodiment, which can be combined with other embodiments described herein, the gap-fill material 504B is reduced via thermal curing, such thermal curing, chemical reduction, and UV treatment, such as UV curing. Operations 401A-404A, 401B-404B, form a single layer stack flat optical device 100 that includes the layer stack 101A. At operation 405A, 405B, operations 401A-404A, 401B-404B are repeated at least once to form a multi-layer stack optical device having the layer stack 101A and at least one layer stack 101B. The layer stack 101B includes at least the encapsulation layer 306A, the arrangement of a plurality of pillars 104B, and the encapsulation layer 306B.

Figure 6:
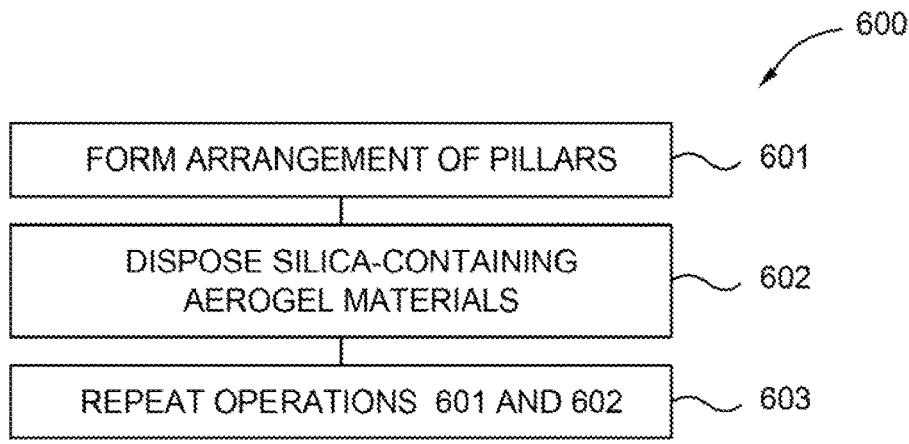
FIG. 6 is a flow diagram of a method of forming a flat optical device according to an embodiment described herein.
Figure 7A:
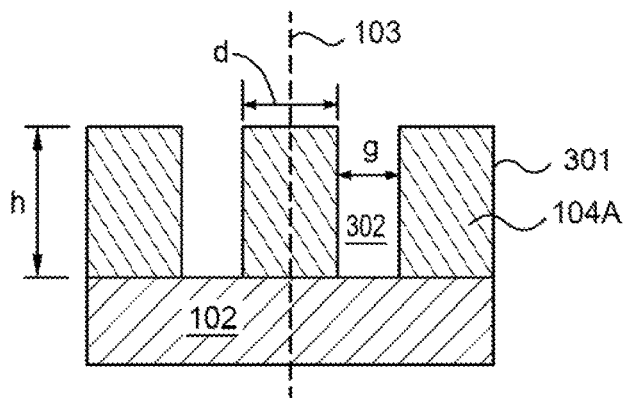
FIGS. 7A-7C are schematic, cross-sectional views of a substrate during a method of forming a flat optical device according to an embodiment described herein.
Figure 7B:
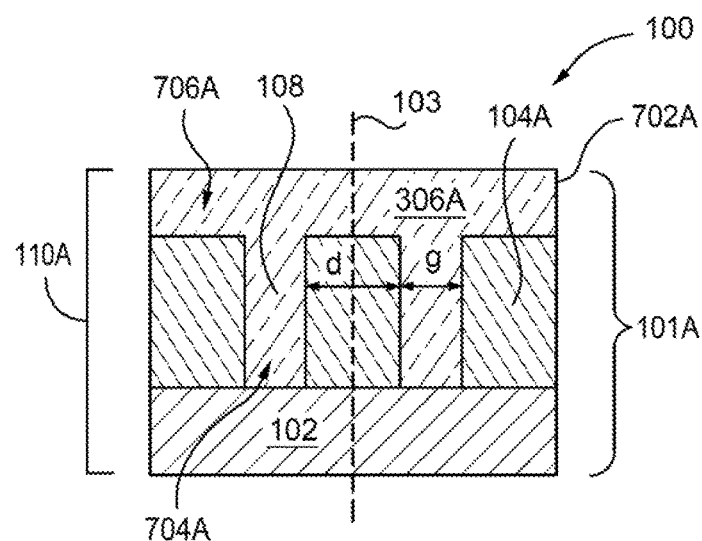
Figure 7C:
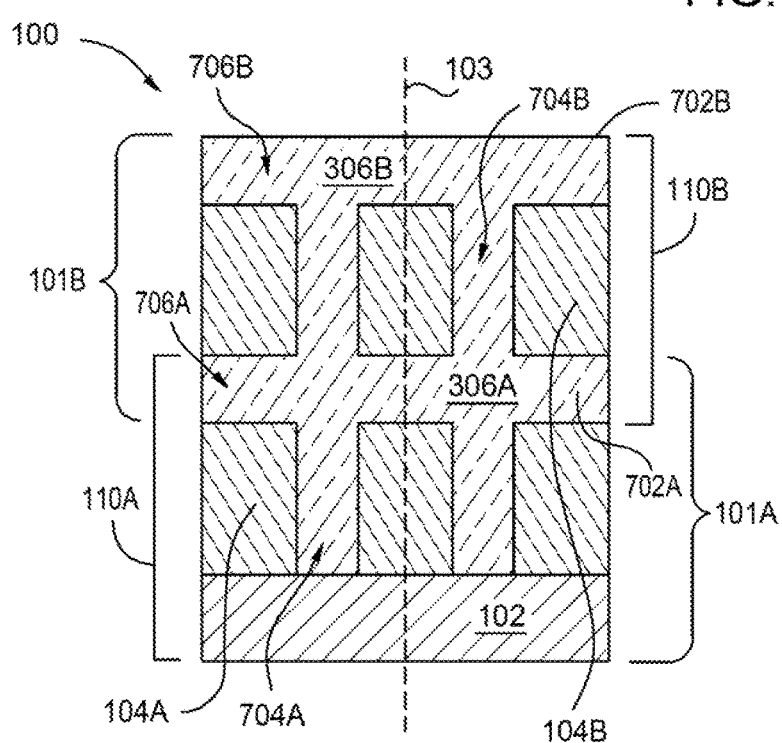

FIG. 6 is a flow diagram of a method 600 of forming a flat optical device 100, as shown in FIGS. 7A-7C. At operation 601, as described in operation 201 of the method 200, an arrangement of a plurality of pillars 104A is formed on the surface of the substrate 102. At operation 602, a silica-containing aerogel material 702A is disposed over the plurality of pillars 104A. Operations 601 and 602, form a single layer stack flat optical device 100 that includes the layer stack 101A. A gap-fill portion 704A, of the silica-containing aerogel material 702A, is disposed in the trenches 302 correspond to the gap g of the pillars 104A (including the space 108 of the flat optical device 100). An encapsulate portion 706A of the silica-containing aerogel material 702A, is disposed over the plurality of pillars 104A and the gap-fill portion 704A. The encapsulate portion 706B corresponds to the encapsulation layer 306B.

At operation 603, operations 601 and 602 are repeated at least once to form a multi-layer stack optical device having the layer stack 101A and at least one layer stack 101B. The layer stack 101B includes at least the encapsulation layer 306A, the arrangement of a plurality of pillars 104B, and the encapsulation layer 306B. The arrangement of a plurality of pillars 104B formed via operation 601 is disposed on one of the encapsulation layer 306A and a spacer layer (not shown) disposed on the encapsulation layer 306A. The encapsulate portion 706B of the silica-containing aerogel material 702B corresponds to the encapsulation layer 306B. The gap-fill portion 704B of the silica-containing aerogel material 702B is disposed in the trenches 302. In one embodiment, which can be combined with other embodiments described herein, the encapsulation layer 306A, 306B (i.e., the encapsulate portion 706A, 706B) has a thickness of about 1 μm to about 2 μm. The silica-containing aerogel has a refractive index of about 1.0 to about 1.10 and a transmission coefficient less than 0.001. The silica-containing aerogel material includes nanoscale porosities to provide air gaps in the space 108. In one embodiment, which can be combined with other embodiments described herein, the silica-containing aerogel material has a porosity, corresponding to the nanoscale air gaps, of about 95% or greater. The nanoscale porosity of the silica-containing aerogel material reduces the refractive index of solid silica.

The silica-containing aerogel material is formed from a silica-containing aerogel material formation process. The formation process includes a precursor preparation process, deposition process, or supercritical drying process. The precursor preparation process includes preparing silica sol-gels. The sol (i.e., solution) is prepared by addition of a catalyst to a silica precursor solution in a solvent. Examples of the silica precursor include, but are not limited to, tetraethylorthosilicate (TEOS), tetramethylorthosilicate (TMOS), methyltrimethoxysilane (MTMS), methyltriethoxysilane (MTMS), methyltriethoxysilane (MTES), silbond H-5, or polyethoxydisiloxane (PEDS). Examples of the catalyst include, but are not limited to, hydrofluoric acid (HF), hydrogen chloride (HCl), nitric acid ($HNO_3$), sulfuric acid ($H_2SO_4$), oxalic acid ($C_2H_2O_4$), acetic acid ($CH_3COOH$), trifluoroacetic acid (TFA), or ammonium hydroxide ($NH_4OH$). Examples of the solvent precursor include, but are not limited to, methanol, ethanol, and isopropanol. The gel is prepared by ageing the solution which strengthens the solution into a sol-gel by crosslinking. The ageing of the sol-gel keeps the shrinkage during drying to the supercritical drying process.

The deposition process includes disposing the sol-gel via one of spin-coating, dip-coating, or spray-coating. In one embodiment, which can be combined with other embodiments described herein, during the deposition process the substrate 102 is rotated (i.e., spun) about a central axis 103 of the substrate. The substrate 102 is rotated about a central axis 103 such that the aspect ratio of the arrangements of the plurality of pillars 104A, 104B, is between about 1:1.5 and about 1:10, between 1:1.5 and 1:2.5, or between about 1:1.1 and about 1:20. Trenches 302 are filled by the gap-fill portion 704A, 704B, of the silica-containing aerogel material 702A, 702B, to be disposed. The rotation rate may be varied during the deposition process. In one embodiment, which can be combined with other embodiments described herein, the rotation rate during the formation of the encapsulate portion 706A, 706B, is lower that the rotation rate for the gap-fill portion 704A, 704B. The drying process removes the solvent to form the silica-containing aerogel material having nanoscale porosities providing air gaps in the space 108. In one embodiment, which can be combined with other embodiments described herein, the drying process includes, but is not limited to, one or more of supercritical $CO_2$ drying, freeze drying, and pressure drying, such as ambient pressure drying.

Figure 8:
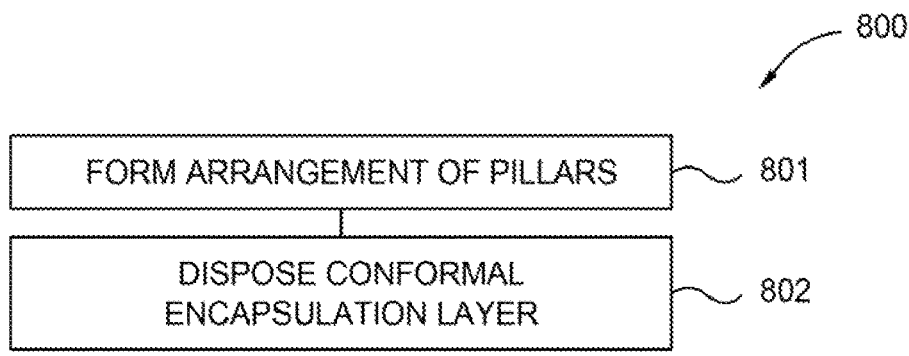
FIG. 8 is a flow diagram of a method of forming a flat optical device according to an embodiment described herein.
Figure 9A:
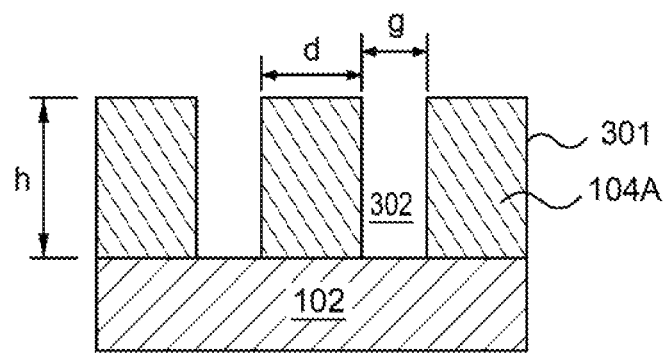
FIGS. 9A and 9B are schematic, cross-sectional views of a substrate during a method of forming a flat optical device according to an embodiment described herein.
Figure 9B:
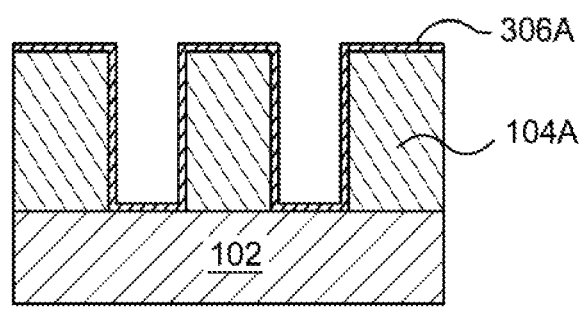

FIG. 8 is a flow diagram of a method 800 of forming a flat optical device 100, as shown in FIGS. 9A and 9B. At operation 801, as described in operation 201 of the method 200, an arrangement of a plurality of pillars 104A is formed on the surface of the substrate 102. At operation 802, a conformal encapsulation layer 306A is disposed over the plurality of pillars 104A. Disposing the conformal encapsulation layer 306A may include, but is not limited to, CVD, PECVD, ALD, rapid ALD, and thermal oxidation. In one embodiment, the conformal encapsulation layer 306A has a thickness of about 2 nm to about 100 nm. In another embodiment, the encapsulation layer 306A has a thickness less than 50 µm. In another embodiment, the encapsulation layer 306A has a thickness of about 1 µm to about 2 µm. In one embodiment, which can be combined with other embodiments described herein, the refractive index of the conformal encapsulation layer 306A is about 1.0 to about 1.5.

In summation, embodiments described herein provide flat optical devices and methods of forming flat optical devices. One embodiment of the optical devices is a single layer stack flat optical device that includes one layer stack. The layer stack includes a first arrangement of a first plurality of pillars disposed on a surface of a substrate and a first encapsulation layer. Another embodiment of the optical devices is a multi-layer stack optical device that includes the first layer stack and a second layer stack formed thereover. The second layer stack of the one or more layer stacks is disposed over the first layer stack. The second layer stack includes second arrangement of a second plurality of pillars disposed on one of the first encapsulation layer and a spacer layer disposed on the first encapsulation layer. The materials, dimensions, and processes described herein of the encapsulation layers, and the composition of a space corresponding to a gap g provides for a height h of the pillars of about 1500 nm or less, and in some embodiments 500 nm or less. The height h of the pillars reduces the thickness of the layer stacks and total thickness of a flat optical device. The reduced total thickness of the flat optical devices provides for higher transmission efficiency due to impedance matching and device symmetry, as compared to bare optical devices, and reduced manufacturing complexity and cost.

While the foregoing is directed to embodiments of the present disclosure, other and further embodiments of the disclosure may be devised without departing from the basic scope thereof, and the scope thereof is determined by the claims that follow.

What is claimed is:

1. A flat optical device, comprising:
   a substrate, the substrate having a first arrangement of a first plurality of pillars formed thereon, the first arrangement of the first plurality of pillars comprising:
   pillars having a height h and a lateral distance d;
   a gap g corresponding to a distance between adjacent pillars of the first plurality of pillars, and
   a silica-containing aerogel material having an absorption coefficient less than 0.001 only disposed in each gap g; and
   a first encapsulation layer disposed on the first arrangement of the first plurality of pillars, the first encapsulation layer is disposed on a top surface of each pillar of the first plurality of pillars and on the silica-containing aerogel material disposed in each gap g, the first encapsulation layer having a refractive index of about 1.0 to about 1.5.

2. The flat optical device of claim 1, wherein the silica-containing aerogel material has nanoscale porosities formed therein.

3. The flat optical device of claim 2, wherein the silica-containing aerogel material and the first encapsulation layer consist of substantially the same materials.

4. The flat optical device of claim 1, wherein the gap g has an air gap disposed in a center opening of the silica-containing aerogel material.

5. The flat optical device of claim 1, wherein a liner is disposed over the pillars.

6. The flat optical device of claim 5, wherein the liner has a thickness of about 1 nanometer (nm) to about 200 nm.

7. The flat optical device of claim 1, further comprising:
   a second arrangement of a second plurality of pillars formed over the first encapsulation layer, the second arrangement of the second plurality of pillars comprising:
   pillars having the height h and the lateral distance d;
   the gap g corresponding to the distance between adjacent pillars of the second plurality of pillars, and
   a silica-containing aerogel material having an absorption coefficient less than 0.001 only disposed in each gap g; and
   a second encapsulation layer disposed on the second arrangement of the second plurality of pillars, the second encapsulation layer is disposed on a top surface of each pillar of the second plurality of pillars and on the silica-containing aerogel material disposed in each gap g, the second encapsulation layer having the refractive index of about 1.0 to about 1.5.

8. The flat optical device of claim 1, wherein the pillars comprise one or more of titanium dioxide (TiO$_2$), zinc oxide (ZnO), tin dioxide (SnO$_2$), aluminum-doped zinc oxide (AZO), fluorine-doped tin oxide (FTO), cadmium stannate (tin oxide) (CTO), zinc stannate (tin oxide) (SnZnO$_3$), or silicon containing materials.

9. The flat optical device of claim 1, wherein the fist encapsulation material comprises a lower surface, wherein the lower surface is disposed on a top surface of each pillar of the first plurality of pillars and each gap, and wherein the lower surface is planar over the top surface.

10. A flat optical device, comprising:
   a substrate, the substrate having a first arrangement of a first plurality of pillars formed thereon, the first arrangement of the first plurality of pillars comprising:
      pillars having a height h and a lateral distance d; and
      a gap g corresponding to a distance between adjacent pillars of the first plurality of pillars, wherein each gap g is composed of only a silica-containing aerogel material with nanoscale porosities within the silica-containing material, the silica-containing aerogel material having:
         an absorption coefficient less than 0.001; and
   a first encapsulation layer disposed on the first arrangement of the first plurality of pillars, the first encapsulation layer is disposed on a top surface of each pillar of the first plurality of pillars and on the silica-containing aerogel material disposed in each gap g, the first encapsulation layer having a refractive index of about 1.0 to about 1.5.

11. The flat optical device of claim 10, wherein the gap is less than 350 nanometers (nm).

12. The flat optical device of claim 10, wherein the height h is about 1500 nm or less.

13. The flat optical device of claim 10, wherein the first encapsulation layer has a thickness less than 50 micrometers (μm).

14. The flat optical device of claim 10, further comprising:
   a second arrangement of a second plurality of pillars formed over the first encapsulation layer, the second arrangement of the second plurality of pillars comprising:
      pillars having the height h and the lateral distance d;
      the gap g corresponding to the distance between adjacent pillars of the second plurality of pillars, and
      a silica-containing aerogel material having an absorption coefficient less than 0.001 only disposed in each gap q; and
   a second encapsulation layer disposed on the second arrangement of the second plurality of pillars, the second encapsulation layer is disposed over a top surface of each pillar of the second plurality of pillars and on the silica-containing aerogel material disposed in each gap g, the second encapsulation layer having the refractive index of about 1.0 to about 1.5.

15. The flat optical device of claim 10, wherein the pillars comprise one or more of titanium dioxide (TiO$_2$), zinc oxide (ZnO), tin dioxide (SnO$_2$), aluminum-doped zinc oxide (AZO), fluorine-doped tin oxide (FTO), cadmium stannate (tin oxide) (CTO), zinc stannate (tin oxide) (SnZnO$_3$), or silicon containing materials.

* * * * *